S. E. BARNEY.

Assignor, by mesne assignments, to THE MAGIC RUFFLE COMPANY.

Machine for Making Plaited Puffing.

No. 9,391. Reissued Sept 28, 1880.

Witnesses
J. N. Chumway
Jos. C. Eaile

The Magic Ruffle Co.
assignees of Sam.l E. Barney
Inventor.
By atty.
Wm. E. Earle

UNITED STATES PATENT OFFICE.

SAMUEL E. BARNEY, OF NEW HAVEN, CONNECTICUT, ASSIGNOR, BY MESNE ASSIGNMENTS, TO THE MAGIC RUFFLE COMPANY, OF NEW YORK CITY.

MACHINE FOR MAKING PLAITED PUFFING.

SPECIFICATION forming part of Reissued Letters Patent No. 9,391, dated September 28, 1880.

Original No. 156,119, dated October 20, 1874. Application for reissue filed May 31, 1880.

*To all whom it may concern:*

Be it known that I, SAMUEL E. BARNEY, of New Haven, in the county of New Haven and State of Connecticut, have invented a new Improvement in Machines for Making Plaited Puffing; and I do hereby declare the following, when taken in connection with the accompanying drawings and the letters of reference marked thereon, to be a full, clear, and exact description of the same, and which said drawings constitute part of this specification, and represent, in—

Figure 1:
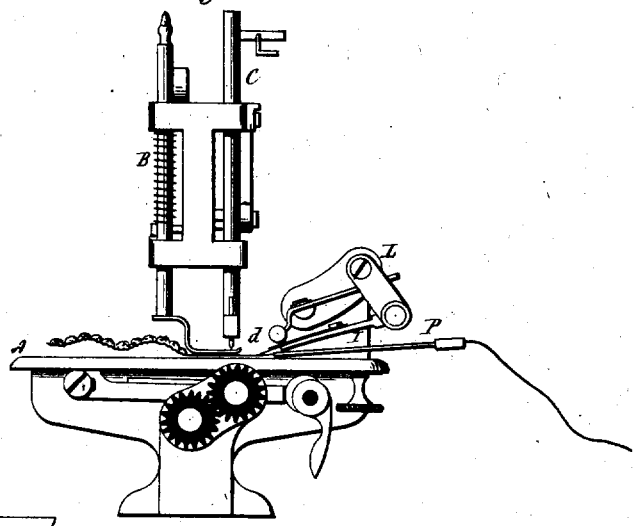
Figure 2:
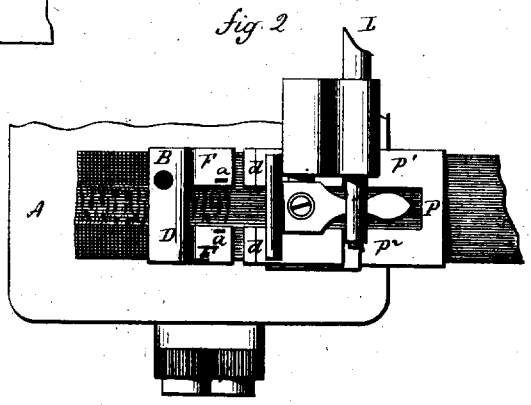
Figure 5:
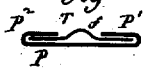
Figure 3:
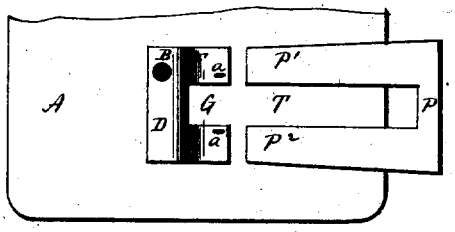
Figure 3A:
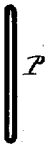

Figure 1, an end view of a machine embodying my invention; in Fig. 2, a partial top view thereof, and in Figs. 3, 3ª, 4, 5, 6, and 7 detached views of the same.

This invention relates to a machine for making that class of plaited trimming known to the trade as "puffing"—that is, a trimming having a line of plaits at each edge, and the fabric between these two lines fulled or puffed, as seen in Fig. 2, the object of this invention being to raise the center or puffed portion above the plaited edges; and the invention consists in the combination of devices, as hereinafter described, and particularly recited in the claims.

The invention is illustrated as applied to the Willcox & Gibbs sewing-machine, in which A is the work-plate; B, the presser-bar; and C, the needle-bar, carrying two needles, as in the Crosby & Kellogg patent, granted December 2, 1862, the needles being arranged to pass through the presser-foot and work-plate at *a a*, and the usual mechanism being provided for interlacing the thread and feeding the work.

Figure 7:
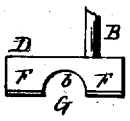

The presser-foot D is attached to the bar B in the usual manner, and the foot divided into two parts, F F, so as to form two bearing-surfaces and leave a space, G, between the two parts, as seen in Fig. 3, this space being equal, or nearly so, to the width of the line of puffing, as seen in Fig. 2. The two parts or divisions F F of the presser-foot are united by a connection over the space between them, and so as to form an arch or bridge, *b*, (see Fig. 7,) beneath which the central portion of the strip of fabric to be operated upon, as hereinafter described, will pass without contact or pressure upon that central portion of its surface.

*d d* are the two plaiting or crimping blades, distant from each other equal, or nearly so, to the width of the said central portion of the strip. These may be separate blades attached to a holder, I, or a single blade slotted, the said blades operated to form the crimps or plaits substantially as in the Crosby & Kellogg machine before referred to—that is, to receive a reciprocating motion from the sewing-machine shaft through a rock-shaft, L, the said blades working to force the edges of the fabric into crimps between the work-plate and the corresponding bearing-surfaces of the presser-foot, or other suitable holding mechanism.

Back of the crimping-blades the guide P is fixed to the work-plate, the width at the outer end being that of the fabric to be introduced, contracting toward the blades to the extent of the transverse fullness required for the puffing. A slot, T, is formed in the center, or on the line to be transversely fulled.

Figure 4:
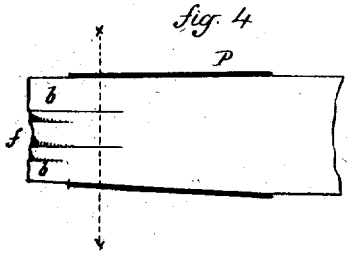
Figure 6:
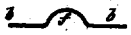

The two sides P′ P² hold the edges flat, and in that condition (see Fig. 4) the fabric is presented to the blades—that is, a portion, *b*, at each edge flat, the center or intermediate portion, *f*, fulled. The flat edges are crimped, plaited, ruffled, or gathered as the fabric is fed through the machine. The intermediate portion of the fabric passing through the slot or space in the guide and presser-foot is not pressed or laid, but receives the fullness of the crimps, which, combined with the transverse fullness given it by the contracting-guide P, raises the center or that portion between the plaits, as seen in Fig. 6, giving it a puffed appearance, as seen in Fig. 2, said puffed or fulled portion passing under the arch or bridge of the presser-foot without pressing contact.

In passing through the machine the stitching mechanism secures the plaits by an independent line of stitches at or near the inner edge of each line of plaits or crimps.

Without the contracting-guide P a very good effect is produced, but the center would not be raised or fulled to the same extent.

I do not broadly claim a slotted or divided presser-foot.

I claim as my invention—

1. The combination of a contracting-guide, whereby the strip is contracted transversely, with a ruffling, gathering, or plaiting mechanism and a stitch-making mechanism, substantially as described.

2. The combination of a ruffling or gathering mechanism, contracting-guide, stitch-making mechanism, and divided presser-foot with the connection between the two parts above their bearing-surface to permit the fulled portion of the fabric to pass freely between the presser-foot and the work-plate, substantially as described.

3. The combination of a slotted or divided contracting-guide with a plaiting or crimping mechanism arranged to operate upon both edges of the fabric as it passes from the contracting-guide, and without directly plaiting or crimping the central portion of the fabric, substantially as described.

4. The combination of a contracting-guide with a plaiting or crimping mechanism arranged to operate upon both edges of the fabric as it passes from the contracting-guide, and without directly plaiting or crimping the central portion of the fabric, with stitching mechanism arranged to stitch the plaited or crimped edges of the fabric, substantially as described.

SAML. E. BARNEY.

Witnesses:
JOHN E. EARLE,
JOS. C. EARLE.